(12) United States Patent
Salazar et al.

(10) Patent No.: US 7,836,063 B2
(45) Date of Patent: Nov. 16, 2010

(54) CUSTOMIZABLE DATA TRANSLATION METHOD AND SYSTEM

(75) Inventors: Fernando Salazar, Arlington, MA (US); Bryan B. Sorrows, Carlisle, MA (US); Sankaranarayanan Rathinagopal, Nashua, NH (US)

(73) Assignee: International Business Machines Corporation, Armonk, NY (US)

( * ) Notice: Subject to any disclaimer, the term of this patent is extended or adjusted under 35 U.S.C. 154(b) by 1648 days.

(21) Appl. No.: 10/734,965

(22) Filed: Dec. 15, 2003

(65) Prior Publication Data

US 2005/0131970 A1    Jun. 16, 2005

(51) Int. Cl.
*G06F 17/30* (2006.01)

(52) U.S. Cl. ............................ 707/756; 707/760
(58) Field of Classification Search .............. 707/100, 707/104.1, 102
See application file for complete search history.

(56) References Cited

U.S. PATENT DOCUMENTS

| | | | | |
|---|---|---|---|---|
| 5,819,291 A | * | 10/1998 | Haimowitz et al. | 707/201 |
| 6,016,501 A | * | 1/2000 | Martin et al. | 707/203 |
| 6,058,239 A | * | 5/2000 | Doyle | 386/46 |
| 6,978,115 B2 | * | 12/2005 | Whitehurst et al. | 434/350 |
| 6,985,905 B2 | * | 1/2006 | Prompt et al. | 707/102 |

* cited by examiner

*Primary Examiner*—Baoquoc N To
(74) *Attorney, Agent, or Firm*—Daniel E. McLoughlin, Esq.; Steven M. Greenberg, Esq.; Carey Rodriguez Greenberg & Paul LLP

(57) ABSTRACT

The method and system of the present invention provides a customizable and configurable data translation tool that transforms data from one learning format to another. The invention further provides a flexible handling of data sources by extracting source data, such as user and course data in an e-learning model, and transforming the data into a form that is compatible with a Learning Management System (LMS). The invention provides flexible data targets by transforming the data into a form that not only preserves all relevant information from the source for loading into the target LMS but also produces industry standard files including metadata that can be used to modify the course or produce a new course by using a course authoring tool. Course structure and progress data can be transferred to the new LMS by re-loading the content on the LMS and linking that content with the previous course and progress data. The present invention also generates new unique identifiers, and utilizes the capabilities of the user migration to link progress data, instructor information, and progress with previous identifiers.

12 Claims, 4 Drawing Sheets

CUSTOMIZABLE DATA TRANSLATION METHOD AND SYSTEM

BACKGROUND OF THE INVENTION

1. Statement of the Technical Field

The present invention relates to the field of data management and more particularly to a method and system of transforming and migrating complex learning data comprising course and user structure, management and progress information from a data source to a new target source.

2. Description of the Related Art

Learning management systems provide for the total management of an on-line learning experience—from content creation to course delivery. In the prototypical learning management system, one or more course offerings can be distributed using computer communications network for delivery to students enrolled in one or more corresponding courses. The course offerings can include content which ranges from mere text-based instructional materials to full-blown interactive, live classroom settings hosted entirely through the computer communications network. So advanced to date has the ability of learning management systems to deliver content become, that nearly any learning experience formerly delivered through in-person instruction now can be delivered entirely on-line and even globally over the Internet.

The conventional learning management system can include a learning management server configured to manage the introduction and distribution of course materials to enrolled students. The learning management server further can be configured to import course content and the structure and arrangement of the course content created both by coupled authoring tools and third party authoring tools which can package course content according to any one of the well known course content packaging standards, such as the ADL Shareable Content Object Reference Model (SCORM) and Aviation Industry CBT Committee (AICC). Once imported, online course instances can be created based upon a course master reflecting the packaged course content and metadata describing the structure and arrangement of the course content. The on-line course instances can be cataloged for public availability to registered students and the content reflected within the on-line course instances can be distributed to the students on-demand.

While learning management systems have their obvious benefits, they are relatively new and businesses must eventually face the difficult task of transferring existing learning course structure, progress and management data from a data source associated with a previous learning model, to a new target source associated with the learning management system. However, migrating user and course data from one database structure to another has its inherent difficulties. For example, the Lotus LearningSpace tool incorporates a database of student and course data in a particular format or schema that would not be compatible with a new learning management system that incorporates standard directories for user management such as Lightweight Directory Access Protocol (LDAP) servers.

Many data transformation processes that transform data from one or more operational applications to a data warehouse utilize what is known as ETL or Extraction, Transformation and Loading. In this process, data is extracted on a periodic basis from a relational database and transformed before it is loaded into a target database such as a data warehouse. The transformation process however requires the data to be merged from disparate systems, scrubbed for inconsistencies and pre-aggregated for fast analysis.

Typical ETL transformation processes do not provide the flexibility to transform complex learning structures, such as data used in a learning management system, and to integrate existing applications into enterprise applications utilizing corporate directories. Further, ETL schemes using data warehouses as the target databases require keeping the original system's keys in the target data warehouse. It is therefore desirable to have a method and system which overcomes the above-described deficiencies and which provides a flexible process for the customizable and configurable translation of data from one format to another.

SUMMARY OF THE INVENTION

The present invention addresses the deficiencies of the art in respect to data transfer tools and provides a novel and non-obvious method and system for translating user and course-related data in a learning management system (LMS) to a format consistent with the LMS target database.

The invention provides flexible handling of data sources by extracting source data, such as user and course data in an e-learning model, and transforms the data into a form that is compatible with a Learning Management System (LMS). The invention provides flexible data targets by transforming the data into a form that not only preserves all relevant information from the source for loading into the target LMS but also produces industry standard files including metadata that can be used to modify the course or produce a new course by using a course authoring tool. Course structure and progress data can be transferred to the new LMS by re-loading the content on the LMS and linking that content with the previous course and progress data. The present invention also generates new unique identifiers, and utilizes the capabilities of the user migration to link progress data, instructor information, and progress with previous identifiers.

Methods consistent with the present invention provide a method of transforming source data from a source database to a target database in a data management system. The method includes converting the source data to a format compatible with the target database where the converted source data contains object identification information. The method matches object identifiers with corresponding object identification information contained in the converted source data if there is an existing directory containing object identifiers related to the object identification information contained in the converted source data. Finally, the method loads the converted source data into the target database.

Systems consistent with the present invention include a data transformation tool for transforming source data from a source database to a target database in a data management system. The tool includes a data transformation utility adapted to convert the source data to a format compatible with the target database where the converted source data contains object identification information. The tool further includes a data matching utility adapted to determine if there is an existing directory containing object identifiers related to the object identification information contained in the converted source data and to match the object identifiers with corresponding object identification information contained in the converted source data. Finally, the tool includes a data loading utility adapted to load the converted source data into the target database.

In accordance with still another aspect, the present invention provides a computer-readable storage medium storing a computer program which when executed performs a data transformation method. The computing method includes converting source data to a format compatible with a target database where the converted source data contains object identification information. The method matches object identifiers with corresponding object identification information contained in the converted source data if there is an existing directory containing object identifiers related to the object identification information contained in the converted source data. Finally, the computing method loads the converted source data into the target database Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention provides a data transformation tool that transforms data from a source database to a target database with particular application to course structure, management, progress and user data in a learning management system environment. The data migration process of the present invention involves four stages. First, source data is extracted from the source database and output to an Extensible Markup Language (XML) file containing extracted user-related tables. The data then undergoes a series of Extensible Style Language (XSL) transformation operations that converts the data into a format compatible with the Learning Management System (LMS). The LMS uses standard directories for user management in the form of Lightweight Directory Access Protocol (LDAP) servers and caches this information in the LMS database. The LMS then assigns a unique, internal user ID for users in the LMS and maintains the association of that internal user ID with an LDAP user ID. Finally, the data is inserted into the LMS database.

Figure 1:
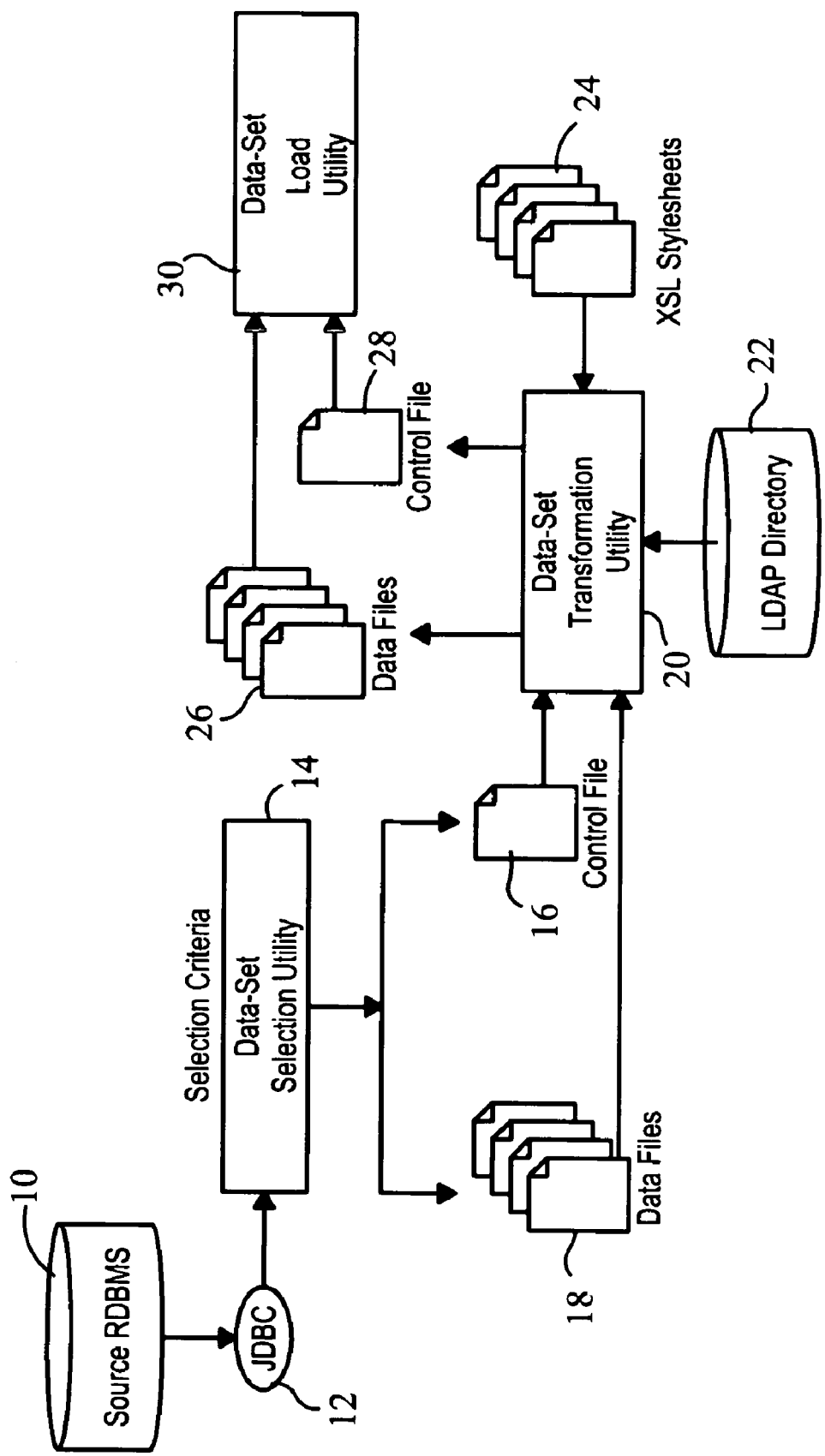
FIG. 1 is a schematic illustration of the data transformation process of the present invention.

Referring now to the drawing figures in which like reference designators refer to like elements, there is shown in FIG. 1 a schematic illustration of the data transformation process of the present invention. FIG. 1 illustrates the overall flow of data from the source data store an LMS database. It does not differentiate between the migration of user-related data and course-related data, which are handled separately by the invention since the selection criteria is different for each.

Figure 2:
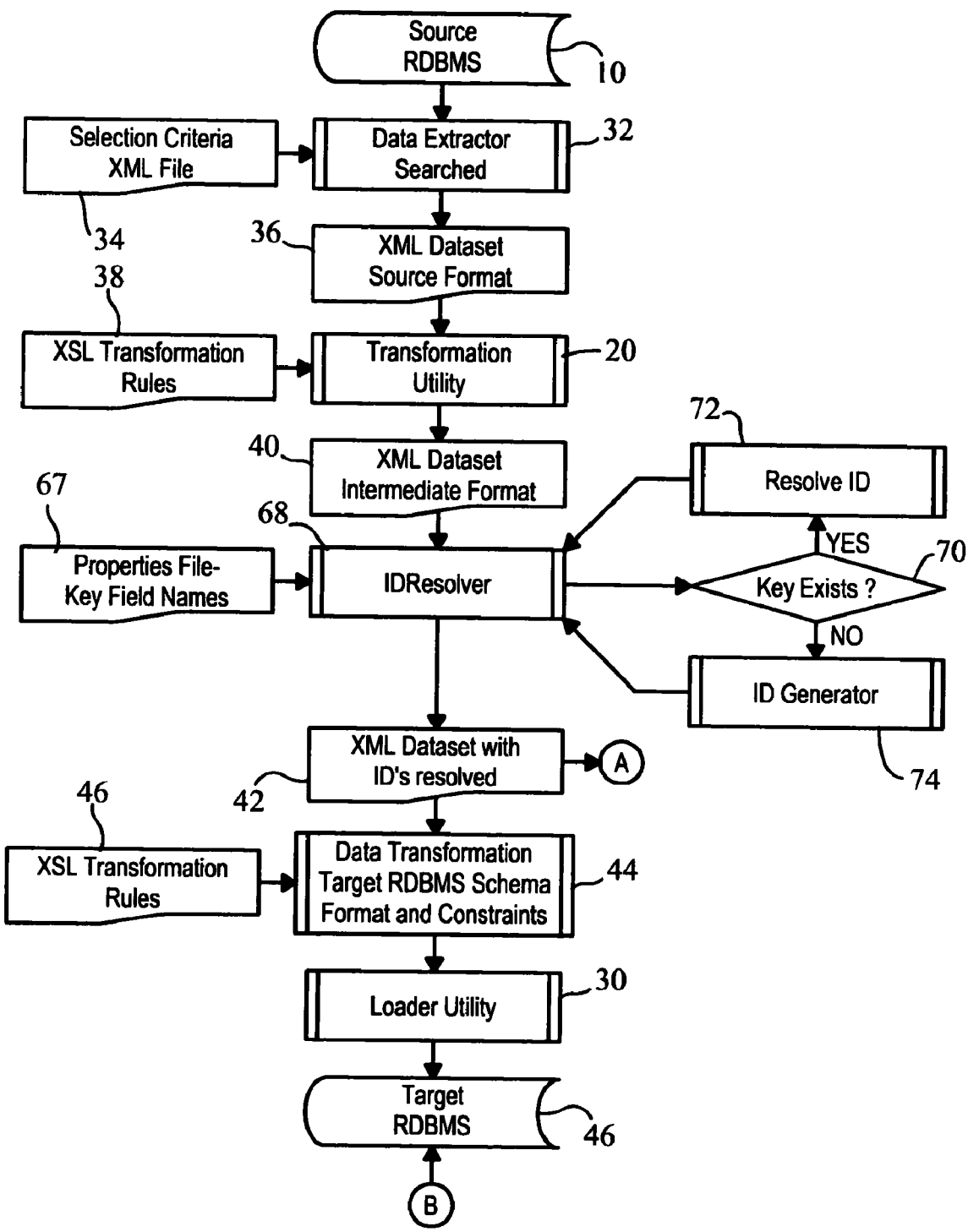
FIG. 2 is a flow chart illustrating the data transformation process with respect to user data being transformed to a format required by the target RDBMS schema.
Figure 3:
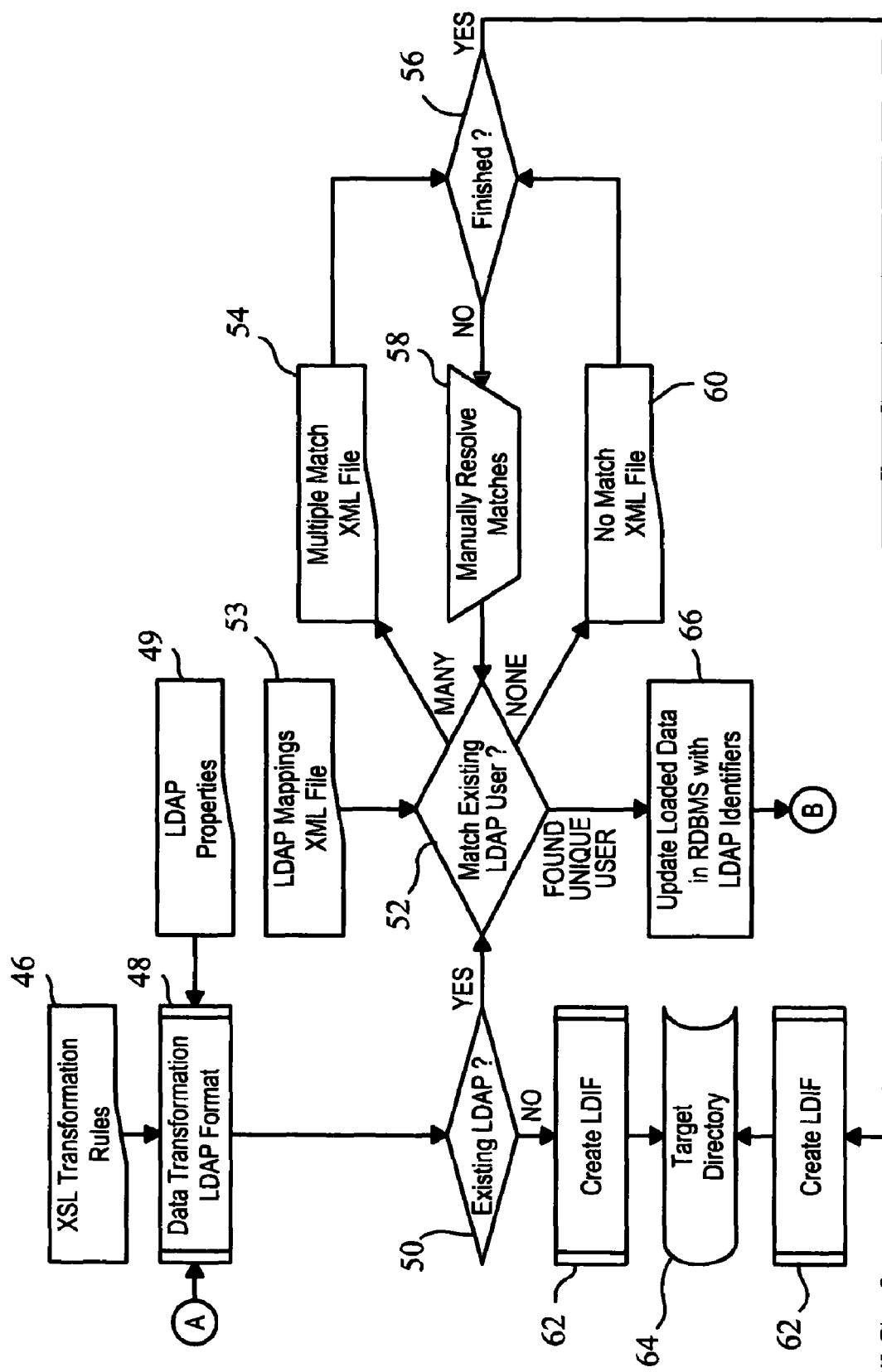
FIG. 3 is a flow chart illustrating the data transformation process with respect to user data being transformed to a format compatible with the target directory.
Figure 4:
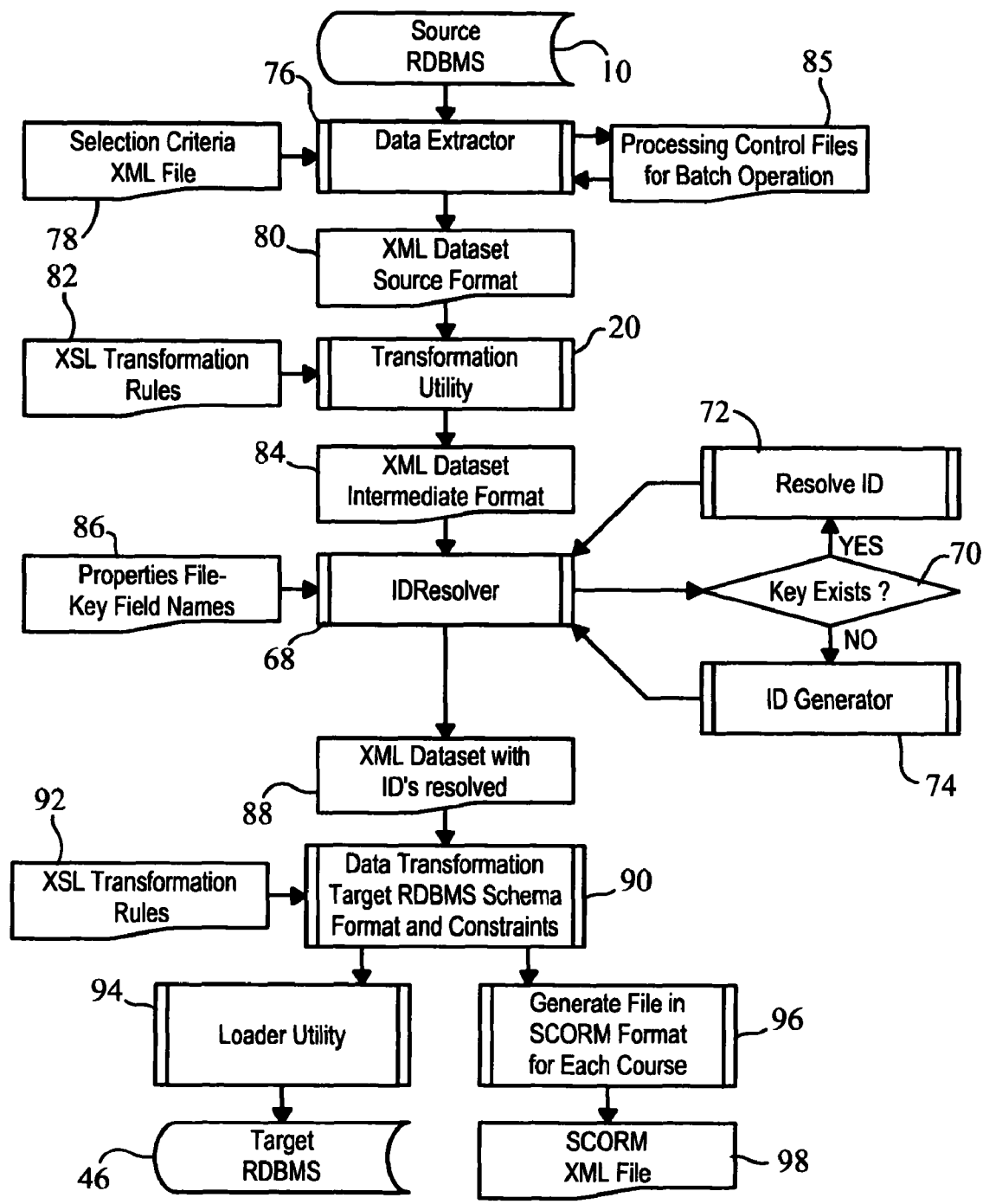
FIG. 4 is a flow chart illustrating the data transformation process with respect to course data.

FIGS. 2 and 3 illustrate the user data migration process and FIG. 4 illustrates the course data migration process.

Source data, containing data relating to course materials, course management, student information, and user progress data, is stored in a data source 10, typically a Relational Database Management System (RDBMS) or any other type of data source with a Java Database Connectivity (JDBC) interface 12. The data is extracted from data source 10 and a data-set selection utility 14 is applied. The selection criteria used extracts only the minimal dataset required to migrate the source data to the target directory, for example, a Learning Management System (LMS) database. The extracted data is stored as XML data files 18 and managed by control file 16. In the case that the source data is already in XML format, the extraction process need not be invoked. Advantageously, although the system and process of the present invention is particularly adaptable for the conversion of data from a Lotus LearningSpace system to an LMS, the tools incorporated in the invention are customizable and therefore adaptable for the migration of data from any source as long as an XML representation of the data can be produced.

The XML data files are then transformed utilizing a dataset transformation utility application 20 which performs a series of XSL 24 operations upon the extracted data where XSL stylesheets convert the extracted data into a format compatible with learning management systems and load the data into the LMS target cached tables. If there is an existing corporate LDAP directory 22, a pattern-matching application is invoked that uses heuristics to attempt to match user names from the source data with existing users in the LDAP directory. If there is more than one match in the LDAP directory, or if no match is found, the present invention allows for user intervention where an operator can manually re-run the matching process in order to find the closest possible match. This is discussed in greater detail below. The resulting data files 26 and control file 28 are then loaded, via a data-set load application 30, into the target LMS database.

FIG. 2 illustrates a process of the migration utility of user-related data from the source RDBS 10 to a target directory. This utility migrates all user information from an existing system to a new LMS installation, including the creation of a Lightweight Directory Interchange Format (LDIF) file for the population of the new target LDAP. The user-migration utility is run before the course-migration utility. User migration involves two steps. First, the users are migrated into the LMS. Second, either the resulting LDIF file is loaded into an empty LDAP server, or the users are merged with an existing corporate LDAP.

The data extraction process 32 unloads data based on user-supplied selection criteria 34. Once grouping information and identifiers have been resolved the data can be broken into two streams. The first stream is transformed into a format required by the target RDBMS schema and loaded. This stream is depicted in the flow chart in FIG. 2. The second stream is transformed into a format that is similar to the target user directory, for example an LDAP, schema. The second stream is shown in FIG. 3.

Returning to FIG. 2, the resulting XML source data 36 is transformed via a set of XSL transformation rules 38. The data-set transformation utility described above converts the data into an intermediary XML dataset 40 that is in an LMS-compatible format. The ID Resolver 68, by utilizing key field names 67, preserves master/child relationships, and calls to other utilities that can create new identifiers 74, or return existing identifiers if they already exist 70. Once the identifiers are resolved 72, the XML dataset 42 (after user ID's have been resolved) is transformed 44 to a format similar to the target RDBMS format via XSL transformation guidelines 46, where the data-set load utility 30 places the transformed data into the target RDBMS data tables 46.

Referring now to FIG. 3, the source data is transformed into a format resembling the target LDAP (step 48) using LDAP properties 49. The XML dataset 42 from FIG. 2 is transformed via data transformation step 48 to produce one of two data files. The system determines if there is an existing LDAP directory (step 50) and if there is, attempts to match the user source data with the user data in an LDAP XML file 53 via step 52. If there is an LDAP directory and the user data is merged with the existing directory, calls are made to the directory attempting using several criteria such as pattern matching heuristics in an attempt to find a unique match. Several calls are made for each user being migrated in an attempt to find the best match. If a unique match is made, the Relational Database Management System (RDBMS) can be updated with the identifier from the existing directory 66, with a link maintained for the later migration of the content. The LDAP lookup process can be a recursive process with or without user intervention.

The result of step 52 may be many matches or no matches. If the calls to the directory found matches but could not find one unique match, an XML file 54 is produced listing the possible multiple matches, and the operator can decide (step 56) to intervene and manually resolve the match (step 58) and re-process the file through the matching process. If the calls to the directory do not result in a match, an XML "no match" file 60 is created that is of the same format as the xml file that entered the matching process. Again, the operator can choose to manually match these records in the file and re-run (recursively) the matching process, or an LDIF file 62 can be created and unmatched users loaded into the existing LDAP target directory 64.

Referring to FIG. 4, the course data migration process of the present invention can be seen. The course data migration progress is similar to the user data-migration process of FIGS. 2 and 3, except that the data here relates to course-related information. Data is extracted (step 76) from the source RDBMS 10 and transformed into an XML intermediate dataset 84. The data extraction process can be run in a batch operation where the extractor builds batch control files 85 from unloaded data, or data can be processed in smaller logically complete increments, for example, one course at a time.

The extractor produces an intermediate dataset 84 that is then transformed by flattening and grouping data into a form that the ID Resolver can work with. After the ID issues are resolved by the ID Resolver and the ID routine that resolves ID issues 72 by either utilizing an existing key (step 70) or generating a new key (step 74), the course data is transformed again into a format very close to the target data schema. The course data may be formatted into a SCORM format for each course (step 96) and loaded as SCORM XML files into a target RDBMS (step 98). The system of the present invention loads user progress data into the target RDBMS in a format that is runable, but also takes a subset of that data and produces a second target which is an industry standard SCORM file that can be imported into any LMS, or brought into an authoring tool for modifications, and be re-published The method and system of the present invention provide a customizable and configurable data translation tool that transforms data from one learning format to another. The tool filters the source data, uses pattern-matching heuristics to integrate target data with a corporate directory and allows for user intervention if the matching heuristics do not fully resolve the integration. Advantageously, the flexibility of the present invention generates new unique identifiers on target system while maintaining links between progress data, instructor information and user information that existed in source system. The system further allows for customized callouts for ID generation, and maintains hierarchal relationships by generating positional attributes for character-mapped trees.

Although geared toward learning management systems, the method and system of the present invention is equally adaptable to be used to transform data from other data sources or schemas by the use of customizable filter input files, and is configurable through the customizable Extensible Style Language Transformation (XSLT) rules to produce data for any target schema. Where there is an existing corporate LDAP, the present invention uses pattern matching heuristics to attempt to match users from the source system with existing users in the LDAP directory and allows for customer intervention in the case where there is more than one match in the LDAP directory, or if there is not a match in the LDAP directory.

The present invention can be realized in hardware, software, or a combination of hardware and software. For example, the data transformation tool of the present invention can be stored in a database. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein. For example, the data transformation tool can be stored in a database.

A typical combination of hardware and software could be a general purpose computer system having a central processing unit and a computer program stored on a storage medium that, when loaded and executed, controls the computer system such that it carries out the methods and functions described herein. The present invention can also be embedded in a computer program product, which comprises all the features enabling the implementation of the methods described herein, and which, when loaded in a computer system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

We claim:

1. A method of transforming user information and course information from a source database in an e-learning model to a target database in a learning management system, the method comprising:

converting the user and course information to a format compatible with the target database, the converted user and course information containing object identification information;

matching object identifiers with corresponding object identification information contained in the converted user and course information when there is an existing directory containing object identifiers related to the object identification information contained in the converted user and course information and loading the converted user and course information into the target database; and, storing unmatched object identifiers for manual handling, and, creating a file containing the unmatched object identifiers having a format similar to the converted user information and course information.

2. The method of claim 1, further comprising updating the source database to include the object identifiers contained in the existing directory if a match is found.

3. The method of claim 1, wherein the object identification information and the object identifiers relate to names of users of the learning management system.

4. The method of claim 1, further comprising when more than one potential match is found, creating a file containing the potential matches and re-generating the matching process.

5. A computer-readable storage medium storing a computer program which when executed performs a method of transforming user information and course information from a source database in an e-learning model to a target database in a learning management system the method comprising:

converting the user and course information to a format compatible with the target database, the converted user and course information containing object identification information;

matching object identifiers with corresponding object identification information contained in the converted user and course information when there is an existing directory containing object identifiers related to the object identification information contained in the converted user and course information, and loading the converted user and course information into the target database; and, storing unmatched object identifiers for manual handling: and, creating a file containing the unmatched object identifiers having a format similar to the converted user information and course information.

6. The computer-readable storage medium of claim 5, wherein the method performed by the stored computer program when executed further includes updating the source database to include the object identifiers contained in the existing directory when a match is found.

7. The computer-readable storage medium of claim 5, wherein the object identification information and the object identifiers relate to names of users of the learning management system.

8. The computer-readable storage medium of claim 5, further comprising when more than one potential match is found, creating a file containing the potential matches and re-generating the matching process.

9. A computer system for transforming user information and course information from a source database in an e-learning model to a target database in a learning management system, the computer system comprising:

a computer comprising memory and a processor; and, storage medium containing a set of computer program instructions; a data transformation utility, executing in the memory by the processor of the computer, the data transformation utility comprising the set of computer program instructions that when executed by the processor convert the user information and course information to a format compatible with the target database, the converted user information and course information containing object identification information;

a data matching utility, executing in memory by a processor of a general purpose computing system, the data matching utility comprising the set of computer program instructions that when executed by the processor determine when there is an existing directory containing object identifiers related to the object identification information contained in the converted user information and course information and to match the object identifiers with corresponding object identification information contained in the converted user information and course information and to store unmatched object identifiers for manual handling; and, a data loading utility , executing in memory by a processor of a general purpose computing system, the data matching utility comprising the set of computer program instructions that when executed by the processor load the converted user information and course information into the target database and, a file containing the unmatched object identifiers having a format similar to the converted user information and course information.

10. The computer system of claim 9, wherein the data matching utility is further adapted to update the source database to include the object identifiers contained in the existing directory if a match is found.

11. The computer system of claim 9, wherein the object identification information and the object identifiers relate to names of users of the learning management system.

12. The computer system of claim 9, further comprising a file containing potential matches when more than one potential match is found.

* * * * *